United States Patent [19]
Nishioka et al.

[11] Patent Number: 5,543,241
[45] Date of Patent: Aug. 6, 1996

[54] FUEL CELL

[75] Inventors: Masato Nishioka, Osaka; Akira Hamada, Osaka; Eiji Tateyama, deceased, late of Osaka, by Yosiko Tateyama, legal representative; Nobuyoshi Nishizawa, Osaka; Masaru Tsutsumi, Hyogo, all of Japan

[73] Assignee: Sanyo Electric Co., Ltd., Osaka, Japan

[21] Appl. No.: 276,667

[22] Filed: Jul. 18, 1994

[30] Foreign Application Priority Data

Jul. 16, 1993 [JP] Japan .................................. 5-176934

[51] Int. Cl.⁶ .................................................. H01M 2/14
[52] U.S. Cl. .............................. 429/39; 429/38; 429/34; 429/35; 429/32; 429/101
[58] Field of Search ................................ 429/32, 34, 35, 429/38, 39, 101

[56] References Cited

U.S. PATENT DOCUMENTS 5,169,731 12/1992 Yoshimura et al. ................... 429/32

FOREIGN PATENT DOCUMENTS

| | | |
|---|---|---|
| 53-122739 | 10/1978 | Japan . |
| 53-122740 | 10/1978 | Japan . |
| 59-106748 | 5/1984 | Japan . |
| 61-40478 | 2/1986 | Japan . |
| 61-40479 | 2/1986 | Japan . |
| 3-145159 | 6/1991 | Japan . |
| 3-159538 | 6/1991 | Japan . |

*Primary Examiner*—Bruce F. Bell

[57] ABSTRACT

The present invention discloses a cell structure and a fuel cell that includes at least one cell structure. The cell structure comprises a cell including an electrolyte plate, an anode, and a cathode, the anode being formed on one surface of the electrolyte plate, the cathode being formed on the other surface of the electrolyte plate, an anode terminal electrode connected to the anode electrically, the anode terminal electrode being placed along an edge of the cell structure to be perpendicular with respect to a layered direction in which the cathode, the electrolyte plate, and the anode are layered, a cathode terminal electrode connected to the cathode electrically, the cathode terminal electrode being placed along another edge of the cell structure to be perpendicular with respect to the layered direction, a first gas channel for supplying a reactant gas to the anode in the layered direction, and a second gas channel for supplying the reactant gas to the cathode in the layered direction.

26 Claims, 9 Drawing Sheets

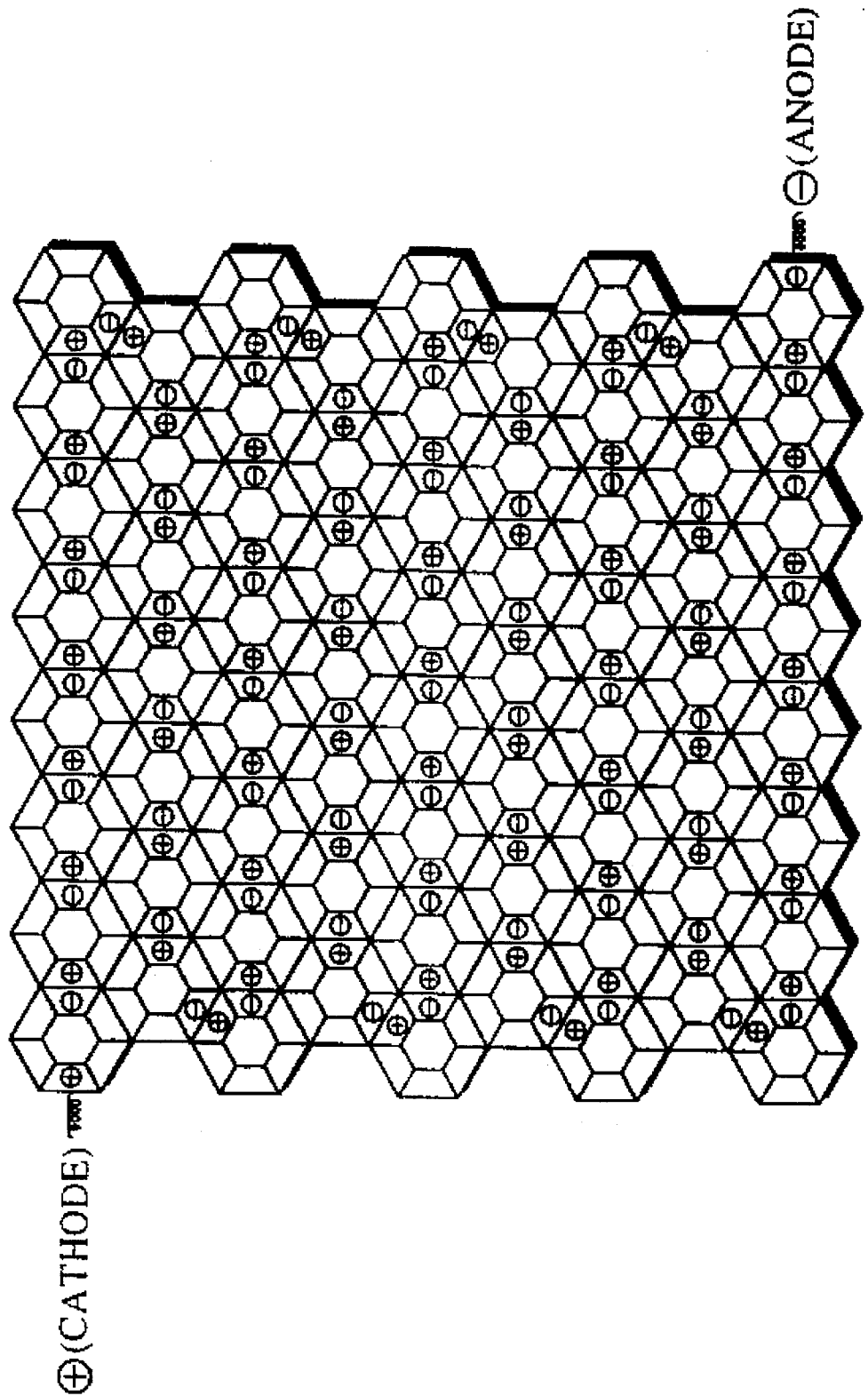

FUEL CELL

BACKGROUND OF THE INVENTION (1) Field of the Invention

The present invention relates to a fuel cell comprising at least one cell structure that includes a cell having an anode and a cathode with an electrolyte being interposed therebetween.

(2) Description of the Related Art

A fuel cell is an energy-conversion device that directly converts an energy of a supplied gas into an electric energy, and researchers have been actively studying a phosphoric acid fuel cell (PAFC), a molten carbonate fuel cell (MCFC), a solid oxide fuel cell (SOFC), and a polymer electrolyte fuel cell (PEFC) to utilize the fuel cell's potential high energy-generation efficiency. The base unit of the fuel cell is a cell having a cathode on one surface, and an anode on the other surface, of an electrolyte membrane.

Since an output voltage (V) and a current density (mA/cm$^2$) of a single cell is limited, a stack is formed by accumulating a plurality of the cells with separators being interposed therebetween to connect the same in series, thereby yielding an output voltage and a current density as desired for individual applications.

For example, given that one cell outputs about 0.6 V, two hundred cells are accumulated to yield about 120 V. However, the resulting stack will be about 2 m high including the thickness of the separators, whereas a space where the fuel cell is installed limits the height of the stack. In addition, manifolds must be attached to all the side surfaces of the stack along the direction in which the cells are accumulated to supply a reactant gas, making the resulting fuel cell considerably large and heavy.

A method to eliminate such a problem is disclosed in Japanese Laid-open Patent Application No. 62-200666. In this method, the cells are inserted in a plurality of through holes formed on an insulating base, and the cells are connected either in series or parallel. Because one base contains a plurality of the cells, a compact, high-voltage generating fuel cell can be assembled. However, although materials forming the cell, such as an electrolyte plate, must be placed accurately in the through hole when assembled, it is by no means easy to do so. Particularly, in case of the PEFC, the electrolyte membrane serving as the electrolyte plate is so soft that considerable skill is required to place the same in the through hole. Also, an anode and a cathode gas pressure cause the electrolyte membrane to sag or the gases to leak during operation.

Moreover, the arrangement of the cells, or the matrix, can not be changed easily because it is inevitably determined by the arrangement of the through holes. Thus, the number and arrangement of the cells can be changed only by replacing the base with a new one having the through holes in a different arrangement.

SUMMARY OF THE INVENTION

Accordingly, the present invention has an object to provide a compact, high-voltage generating fuel cell, which is easy to assemble and whose cell matrix can be easily changed.

The above object can be fulfilled by a cell structure and a fuel cell that comprises at least one cell structure. The cell structure comprises a cell including an anode and a cathode with an electrolyte plate being interposed therebetween, at least one anode terminal electrode electrically connected to the anode, the anode terminal electrode being placed along an edge of the cell, and at least one cathode terminal electrode electrically connected to the cathode, the cathode terminal electrode being placed along another edge of the cell.

The above object can be also fulfilled by a cell structure and a fuel cell that comprises at least one cell structure. The cell structure comprises a cell including an electrolyte plate, an anode, and a cathode, the anode being formed on one surface of the electrolyte plate, the cathode being formed on the other surface of the electrolyte plate, an anode terminal electrode connected to the anode electrically, the anode terminal electrode being placed along an edge of the cell structure to be perpendicular with respect to the direction in which the cathode, the electrolyte plate and the anode are layered, a cathode terminal electrode connected to the cathode electrically, the cathode terminal electrode being placed along another edge of the cell structure to be perpendicular with respect to the layered direction, a first gas channel for supplying a reactant gas to the anode in the layered direction, and a second gas channel for supplying the reactant gas to the cathode in the layered direction.

According to the above construction, the cell structure includes the cell having the anode and cathode with the electrolyte plate therebetween, and the terminal electrodes attached on the side surfaces of the cell. Thus, the cell structure eliminates a process such as fitting the anode, cathode, and electrolyte plate into the through holes formed on the base. Hence, the cell structure can be easily assembled and even when the electrolyte plate is a soft membrane, it can be fixedly inserted into the cell so that it will not sag.

As well, the cell structures can be interconnected not by wiring but by connecting the terminal electrodes directly, and besides the terminal electrodes can be placed along any desired edge. For this reason, a plurality of the cell structures can be interconnected horizontally so that the resulting fuel cell does not gain in height, enabling a compact, high-voltage generating fuel cell whose matrix of the cell structures can be changed easily.

The anode terminal electrode and the cathode terminal electrode may be directly connected to the anode and the cathode respectively.

The cell structure may further comprise at least one first collector plate for connecting the anode terminal electrode and the anode, a window being formed on the first collector plate to supply an anode gas from one surface of the cell to the anode, and at least one second collector plate for connecting the cathode terminal electrode and the cathode, a window being formed on the second collector plate to supply a cathode gas from the another surface of the cell to the cathode.

The cell structure may further comprise a first collector plate for connecting the anode and the anode terminal electrode electrically, the first collector plate being sandwiched by one of the pair of insulating keep-plates and the anode, and a second collector plate for connecting the cathode and the cathode terminal electrode electrically, the second collector plate being sandwiched by the other insulating keep-plate and the cathode, wherein a window may be formed on each collector plate in the layered direction at a location opposing the windows formed on the insulating keep-plates.

According to the above construction, the anode and one of the terminal electrode, and cathode and the other terminal electrode are connected either directly or by means of the collector plates without using a lead or the like, thereby realizing a simple electric connection in addition to the aforementioned effects.

A circumference of the window formed on the first collector plate may be smaller than a circumference of the anode, and a circumference of the second collector plate may be smaller than a circumference of the cathode.

The cell structure may further comprise a pair of insulating keep-plates, the pair of insulating keep-plates sandwiching at least the anode, the cathode, and the electrolyte plate in a direction in which the anode, the cathode, and the electrolyte plate are layered, an opening being formed on each of the insulating keep-plates to supply an anode gas and a cathode gas to the anode and the cathode respectively from two surfaces of the cell respectively.

The cell structure may further comprise a pair of insulating keep-plates for sandwiching at least the anode, the electrolyte plate, and the cathode in the layered direction, the first and second gas channels being formed on the pair of insulating keep-plates respectively.

The first and second gas channels may be windows formed in the layered direction on the pair of insulating keep-plates.

According to the above construction, all the elements of the cell of the present invention are sandwiched by the insulating keep-plates.

The cell structure may further comprise at least one holding member for applying a pressure from outer surfaces of the pair of insulating keep-plates to the pair of insulating keep-plates, the electrolyte plate, the anode, and the cathode to be pressed to each other.

According to the above construction, all the elements of the cell and the insulating keep-plates are further pressed to each other to be fixed by the holding members.

Also, by pressing the collector plates and the electrolyte plate together by means of a pair of the insulating keep-plates, spaces between the electrolyte plate having the anode and cathode and the two collector plates (or between the electrolyte plate and keep-plates) can be sealed off to prevent anode gas and cathode gas leakage during the operation.

A space between the first collector plates and one of the insulating keep-plate opposed thereto may be sealed off by a first sealing member, the first sealing member encircling the windows formed on the first collector plate and the one of insulating keep-plate, a space between the second collector plates and the other insulating keep-plate opposing thereto may be sealed off by a second sealing member, the second sealing member encircling the windows formed on the second collector plate and the other insulating keep-plate, whereby the cathode, the electrolyte plate, the anode, the first and second collector plates, the first and second sealing members are press-adhered by the holding member and the two terminal electrodes.

By this construction, the gas leakage can be efficiently prevented.

Each of the two terminal electrodes may have a U-shaped cross section extending from a side surface to the two surfaces of the cell, whereby the two terminal electrodes apply a pressure from outer surfaces of the pair of insulating keep-plates at least to the insulating keep-plates, the electrolyte plate, the anode, and the cathode to be pressed to each other.

According to the above construction, the U-shaped terminal electrodes also serve as the holding member to fix the cell and the insulating keep-plates. Hence, the number of the holding members can be reduced.

In some cases, the cell and the insulating keep-plates can be held by the terminal electrodes alone when they also serve as the holding members.

The cell structure may be a quadratic prism comprising two terminal electrodes of a same configuration and a same size, and two holding members of a same configuration and a same size, the two terminal electrodes being placed along two edges of the cell respectively, the two holding members being placed along the other two edges of the cell respectively.

The cell structure may be a hexagonal prism comprising two terminal electrodes of a same configuration and a same size, and four holding members of a same configuration and a same size, the two terminal electrodes being placed along two edges of the cell respectively, the four holding members being placed along the other four edges of the cell respectively.

Since at least two terminal electrodes are placed along arbitrary edges the cell of the present invention, the cell structures of the present invention can be aligned horizontally by connecting the terminal electrodes of the adjacent cell structures in any desired manner with all the anodes facing to the first direction and all the cathodes facing to the second direction. For example, when the terminal electrodes are placed along the two opposing edges respectively, a plurality of the cell structures can be easily interconnected in series in a line with all the anodes facing in the first direction and all the cathodes facing in the second direction. Further, a plurality of such cell-structure-lines can be aligned in matrix to form the set explained as above. Thus, the fuel cell can be assembled easily and the cell structures can be interconnected by being aligned (physical contacts) without any wiring. Moreover, the number of the rows and columns can be selected arbitrarily when forming the set.

In other words, the resulting fuel cell can be of any configuration and have any electric connection as desired, enabling a compact, high-voltage generating fuel cell.

In addition, when the gas manifold is attached so as to cover the anodes of the cell structures, the gas manifold covering the cathodes may not be necessary.

The gas manifold may withhold a hydrogen absorbing alloy inside thereof, and the cathodes may be open to air.

The hydrogen absorbing alloy in the anode gas manifold plays a role of the anode gas source. When hydrogen is consumed, the hydrogen absorbing alloy can be replaced with a new one, and the old one is replenished with hydrogen to be used again. Also, a hydrogen replenishing device may be formed to replenish hydrogen to the hydrogen absorbing alloy. Since the above construction obviates the anode gas source such as a hydrogen cylinder, a more compact fuel cell can be assembled.

The fuel cell may comprise two of the sets, the two sets being installed so that the anodes of the two sets oppose each other with the gas manifold being installed therebetween.

The above construction further downsizes the fuel cell; for a single manifold interposed between the two sets to cover the anodes of the two sets is sufficient for the fuel cell to operate.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 11 is a schematic view of the fuel cell of the second embodiment partly replaced with modified cell structures.

DESCRIPTION OF THE EMBODIMENTS

FIRST EMBODIMENT

Figure 1:
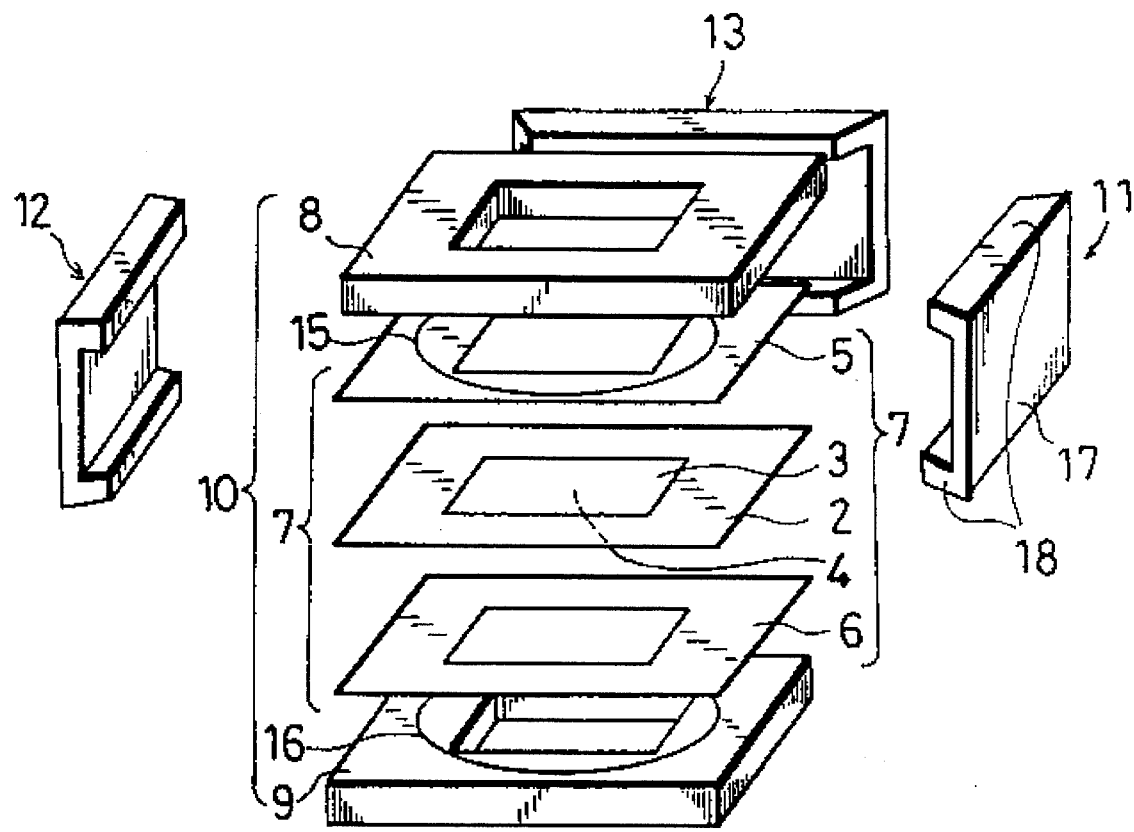
FIG. 1 is an exploded view of a perspective illustration of a cell structure 1 in accordance with a first embodiment of the present invention.
Figure 2:
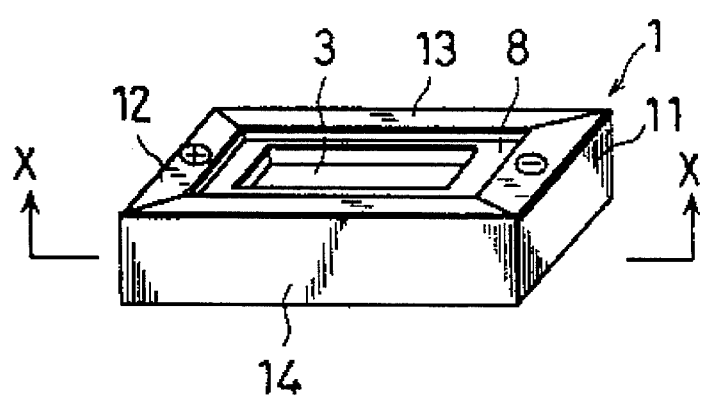
FIG. 2 is a perspective illustration of the cell structure 1.

FIG. 1 is an exploded view of a perspective illustration of a cell structure 1 in accordance with a first embodiment of the present invention. FIG. 2 is a perspective illustration of the cell structure 1, and FIG. 3 is a cross sectional view of the cell structure 1 along the line X—X.

Figure 3:
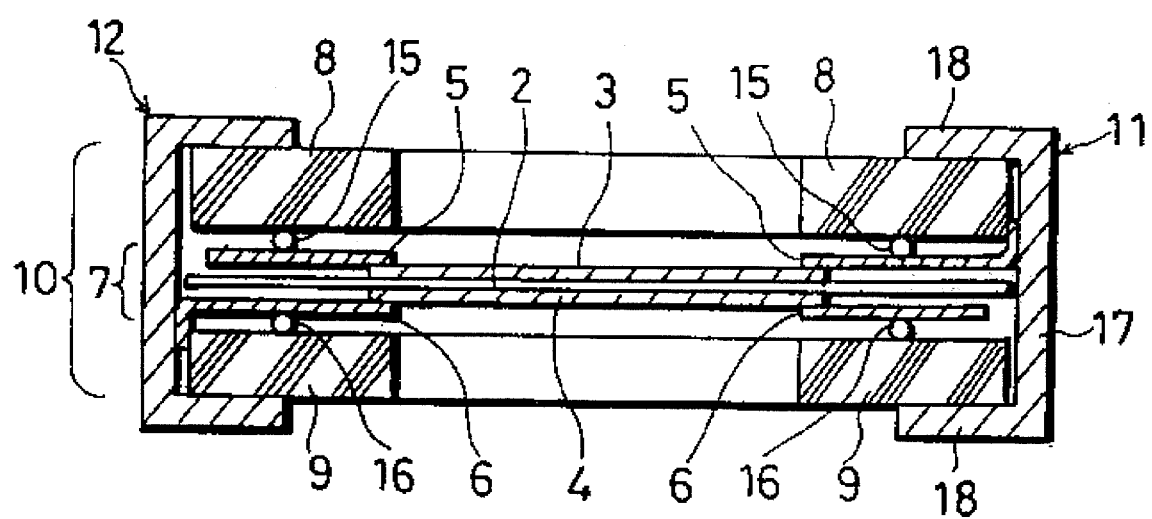
FIG. 3 is a cross sectional view of the cell structure 1 along the line X—X.

As is shown in FIGS. 1–3, the cell structure 1 is a quadratic prism formed as follows.

A cell is composed of a square solid-polymer electrolyte membrane 2 having an anode 3 on one surface and a cathode 4 on the other, and square collector plates 5.6 are layered on the cell in such a way that they are electrically connected to the anode 3 and cathode 4 respectively to form a cell member 7. The cell member 7 is sandwiched by a pair of square insulating keep-plates 8.9 to further form a quadratic prism cell-base 10. A pair of terminal electrodes 11.12, which are electrically connected to the collector plates 5.6 respectively, are attached at two opposing side surfaces of the quadratic prism cell-base 10 (placed along two opposing edges of the cell) respectively, and press-adhesion members 13.14 are attached to the other two opposing side surfaces (placed along the other two opposing edges) respectively. The terminal electrodes 11.12 also serve as the press-adhesion members, and form a frame together with the press-adhesion members 13.14 that encircles all the four side surfaces of the cell-base 10 to serve as holding members, thereby fixing the cell-base 10 by pressing the same firmly together.

The solid-polymer electrolyte membrane 2 is, for example, a perfluorocarbon ion-exchange membrane, commercially known as Nafion (registered trademark of Du Pont), that is a size of about 10 cm×10 cm (preferably 5 cm×5 cm) and a thickness of 0.2 mm. As has been stated, the anode 3 is formed on one surface of the solid-polymer electrolyte membrane 2 and cathode 4 on the other. Both are made of carbon black loading platinum, and of a size of about 5 cm×5 cm (preferably 3 cm×3 cm) with a thickness of 0.1 mm.

The collector plates 5.6 are copper plates of about the same size as the solid-polymer electrolyte membrane 2 with a thickness of 0.5 mm. A 4.5 cm×4.5 cm window is formed at the center of each plate to secure channels to supply an anode gas and a cathode gas to the anode 3 and cathode 4 respectively. The window is made slightly smaller than the anode 3 and cathode 4 to connect the former to the collector plate 5, and the latter to the collector plate 6 electrically by means of a physical contact when layered. The window may be a single hole or a mesh of a plurality of pores. The collector plate 5 is slightly extended toward the terminal electrode 11, and the extended portion beyond the cell-base 10 is bent along the side surface thereof to be connected to the terminal electrode 11 electrically by means of a physical contact. On the other hand, the collector plate 5 is slightly trimmed off at the opposing edge to avoid a physical contact to the terminal electrode 12. Similarly, the collector plate 6 is extended toward the terminal electrode 12 to be electrically connected, while being trimmed off at the opposing edge to prevent a physical contact with the terminal electrode 11.

The insulating keep-plates 8.9 are made of insulating materials such as ceramics or plastics; they are of the same configuration having the windows at the center as the collector plates 5.6, and thick enough, for example 1 cm thick, to sandwich and fix the cell member 7. Additionally, o-rings 15 and 16 are placed between the collector plate 5 and insulating keep-plate 8, and the collector plate 6 and the insulating keep-plate 9 respectively to prevent anode and cathode gas leakage respectively.

The terminal electrodes 11.12 are made of conductive elastic metal, and each comprises an assembly plate 17 and a pair of convex units 18. The assembly plate 17 is of about the same size and configuration as the side surface of the cell-base 10, and the convex units 18 are formed along the top and bottom edges of the surface of the assembly plate 17 opposing to the cell-base 10 to press the circumferences of the outer surfaces of the insulating keep-plates 8.9 vertically. Thus, terminal electrodes 11.12 have U-shaped cross sections as shown in FIG. 3. The press-adhesion members 13.14 are made of insulating elastic materials such as ceramics and plastics, and are of the same configuration as the terminal electrodes 11.12. As previously mentioned, the terminal electrodes 11.12 and press-adhesion members 13.14 form the frame encircling the four side surfaces of the cell-base 10, and thus also serving as the holding members. The contacting surfaces between the terminal electrode 11 and press-adhesion member 13, the terminal electrode 12 and press-adhesion member 14, and the frame and the insulating keep-plates 8.9 are sealed off when assembled to prevent anode gas and cathode gas leakage.

According to the above construction, not only is the quadratic prism cell structure 1 is easily assembled, but also the soft solid-polymer electrolyte membrane 2 can be held so firmly in the cell-base 10 that it will not sag. Note that since the terminal electrodes 11.12 are electrically connected to the anode 3 and cathode 4 respectively, the former serves as the cathode electrode and the latter serves as the anode terminal.

Figure 4:
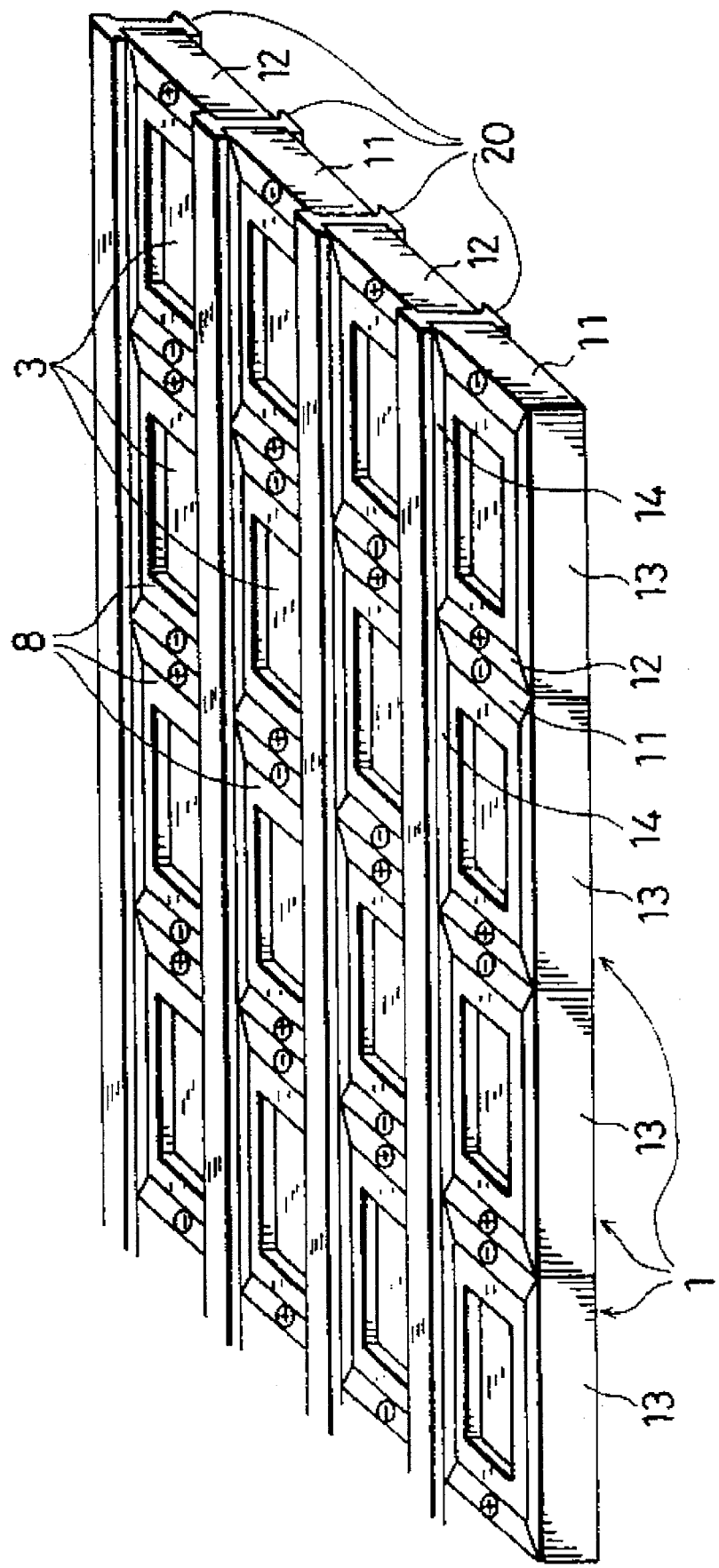
FIG. 4 is a perspective illustration of a main part of a fuel cell comprising a plurality of the cell structures 1.

FIG. 4 is a perspective illustration of a part of a fuel cell comprising a plurality of the cell structures 1 of the first embodiment. This fuel cell comprises an adequate number of cell structures 1 (for example one hundred) aligned horizontally in matrix (for example, ten rows and ten columns) with all the anodes 3 facing upward and all the cathodes 4 facing downward. These aligned cells are referred to as a set hereinafter. The set is encircled by insulating H-shaped rails 20, and the spaces between the rows are also interposed by the insulating H-shaped rails 20. All the top surfaces of the cell structures 1 are covered with an unillustrated anode-gas manifold, so that the anode gas is supplied to the anode 3 of each cell structure 1. Similarly, all the bottom surfaces of the cell structures 1 are covered with an unillustrated cathode-gas manifold, so that the cathode gas is supplied to the cathode 4 of each cell structure 1.

The cell structures 1 are aligned in such a way that the cathode terminal 11 of each cell structure 1 will contact to the anode terminal 12 of the adjacent cell structure 1 in every row. In addition, although it is not shown in the drawing, all the cell structures 1 aligned at the row ends are connected in series by wiring to connect all the cell structures 1 in the set in series as well. The H-shaped rails 20 also form a frame for the set to hold the cell structures 1 fitted into the concave units thereof. The contacting surfaces between the cell structures 1, and the cell structures 1 and the H-shaped rails 20 are sealed off to prevent anode gas and cathode gas leakage. A hydrogen gas is supplied to the anode-gas manifold from a hydrogen source such as a hydrogen cylinder or a hydrogen tank, while air is supplied to the cathode-gas manifold by means of a pump.

Although the cell member 7 and cell-base 10 are quadratic prisms in the foregoing embodiment, they may be a cylinder instead. In this case, the configurations of the terminal electrodes 11.12 and press-adhesion members 13.14 are changed accordingly to form the quadratic prism cell structure 1 and hence the above fuel cell.

Figure 5:
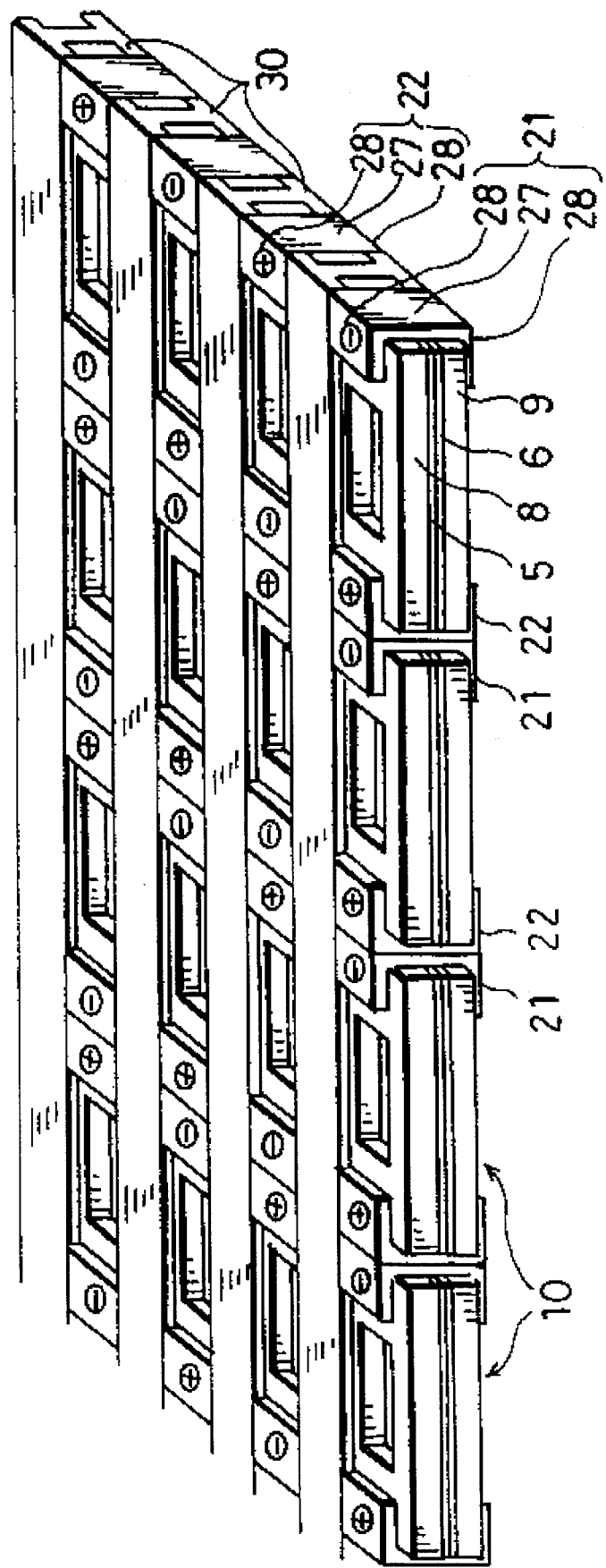
FIG. 5 is a schematic view of a main part of the fuel cell in accordance with the first embodiment of the present invention.

FIG. 5 is a schematic view of a main part of a fuel cell, wherein the cell-base 10 comprises the cell structures 1 held by terminal electrodes 21.22 alone, which also serve as a pair of the holding members.

The cell-bases 10 are aligned in a matrix in the same manner as above, except that H-shaped rails 30 are used instead of the H-shaped rails 20: the side surface of the cell-base 10 is fitted into the concave unit thereof. This means that the concave unit is as long as the side of the cell-base 10, and thus the H-shaped rails 30 become shorter than the H-shaped rails 20.

The terminal electrodes 21.22 function in the same manner as the terminal electrodes 11.12, but are of different structure. In other words, assembly plates 27 of the terminal electrodes 21.22 are rectangles, being as long as the assembly plates 17 of the terminal electrodes 11.12 shown in FIGS. 1–4, while being less wide than the assembly plates 17, or as wide as the space between the top (bottom) edges of the two adjacent H-shaped rails 30; for the side surface of the cell-base 10 is fitted to the concave unit. A pair of convex units 28 are formed at the top and bottom edges to press the circumferences of the outer surfaces of the insulating keep-plates 8.9 vertically as do the convex units 18. Also, the terminal electrode 21 serves as the cathode terminal and the terminal electrode 22 serves as the anode terminal by physically contacting to the anode 3 and cathode 4 respectively. The fuel cell shown in FIG. 5 can be assembled with a predetermined number of the cell structures 1 each including the cell and a pair of the terminal electrode 21.22 with H-shaped rails 30.

The fuel cells assembled as above can be of any structure and have any electric connection as desired. In particular, when a hundred of the cell structures 1 are connected in series with simple wiring as the forgoing embodiment, the resulting fuel cell can output a voltage as high as 60 V.

SECOND EMBODIMENT

Figure 6:
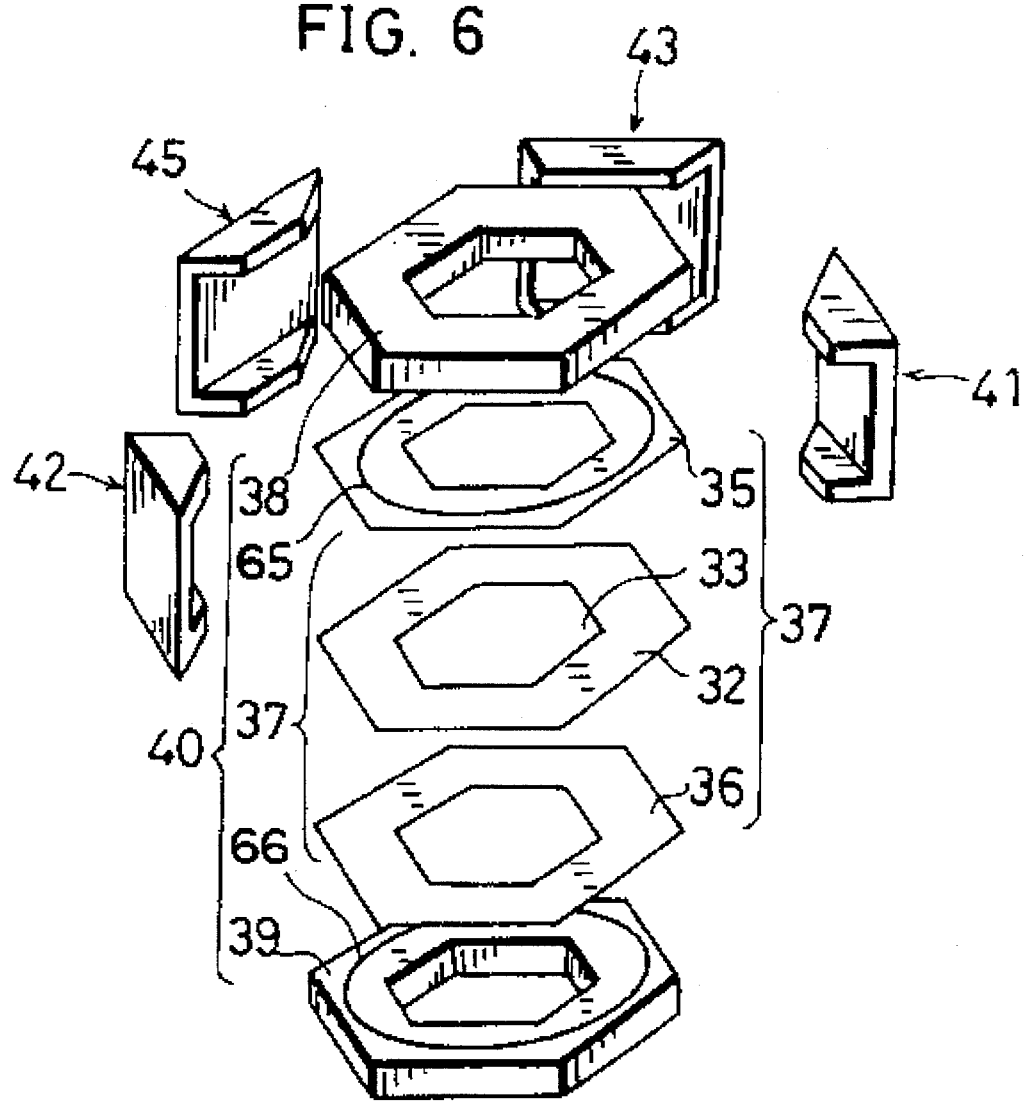
FIG. 6 is an exploded view of a perspective illustration of a cell structures 31 in accordance with a second embodiment of the present invention.
Figure 7:
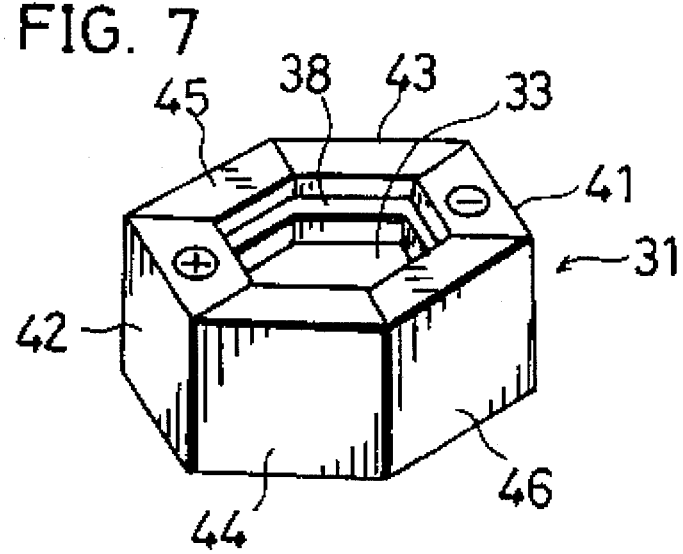
FIG. 7 is a perspective view of the cell structure 31 in accordance with the second embodiment of the present invention.
Figure 8:
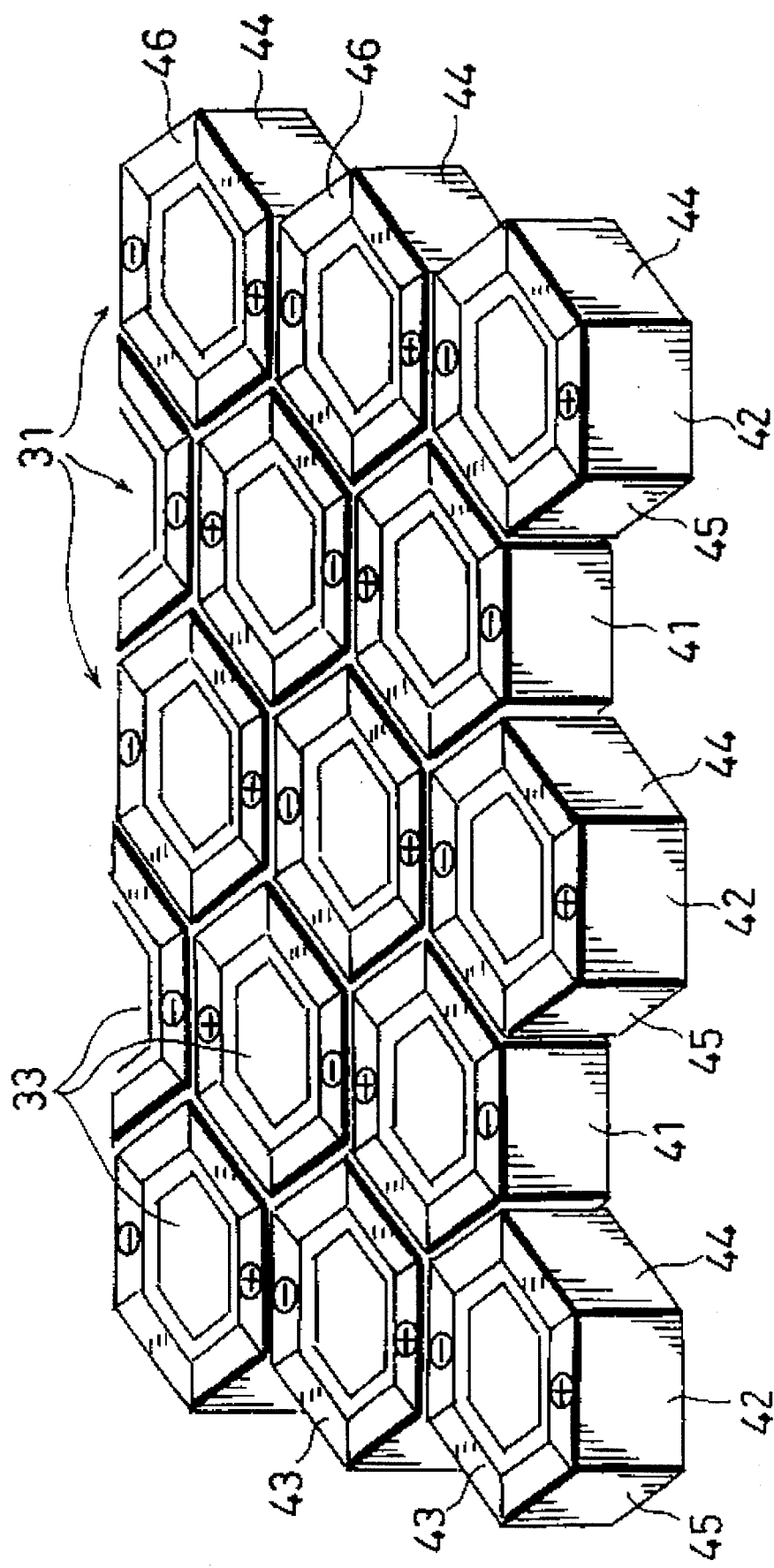
FIG. 8 is a schematic view of a main part of a fuel cell comprising a plurality of the cell structures 31.

FIG. 6 is an exploded view of a perspective illustration of a cell structure 31 in accordance with a second embodiment of the present invention. FIG. 7 is a perspective view of the cell structure 31, and FIG. 8 is a schematic view of a main part of a fuel cell comprising the cell structures 31.

As is shown in FIGS. 6 and 7, the cell structure 31 is a hexagonal prism comprising as follows. A cell is composed of an anode 33 formed on one surface of a hexagonal solid-polymer electrolyte membrane 32 and a cathode (not shown in the drawings) formed on the other. A pair of collector plates 35.36, which are electrically connected to the anode 33 and cathode respectively, are layered on the cell to form a hexagonal prism cell member 37, and the cell member 37 is sandwiched by a pair of insulating keep-plates 38.39 to further form a hexagonal prism cell-base 40.

A pair of terminal electrodes 41.42, which are electrically connected to the collector plates 35.36 respectively, are attached to two opposing side surfaces of the cell-base 40 (placed along two opposing edges of the cell) respectively, and press-adhesion members 43.46 are attached to the other four side surfaces (placed along the other four edges) respectively. The terminal electrodes 41.42 also serve as the press-adhesion members and form a frame, or the holding members, with the press-adhesion members 43.46; the frame encircles all the six side surfaces of the cell-base 40 to fix the cell-base 40 by pressing the same firmly together in the vertical direction.

The solid-polymer electrolyte membrane 32 is the same perfluorocarbon ion-exchange membrane as the one used in the first embodiment, but it is a regular hexagon with a side of 5 cm and a thickness of 0.1 mm. The anode 33 and cathode are made of carbon black loading platinum, and placed on both the surfaces of the solid-polymer electrolyte membrane 32 respectively; the anode 33 and cathode are also regular hexagons with a side of 3 cm and a thickness of 0.1 mm.

Like in the first embodiment, the collector plates 35.36 are copper plates of about the same configuration and size as the solid-polymer electrolyte membrane 32, and a window, slightly smaller than the anode 33 and cathode, is formed at the center of each plate. The collector plate 35 is extended toward the terminal electrode 11 and bent along the side surface of the cell-base 40 to be electrically connected. Similarly, the collector plate 36 is extended toward the terminal electrode 42 to be electrically connected.

The insulating keep-plates 38.39 are of the same configuration as the collector plates 35.36 having the windows at the center. As was in the first embodiment, o-rings 65.66 are placed between the collector plate 35 and insulating keep-plate 38, the collector plate 36 and insulating keep-plate 39 respectively.

The terminal electrodes 41.42 and the press-adhesion members 43.46 are made of the same materials as in the first embodiment, and have U-shaped cross sections. As previously mentioned, these six elements form the frame, or the holding members when assembled, encircling all the six side surfaces of the hexagonal-prism cell-base 40.

According to the above construction, not only the cell structure 31 is easily assembled but also the solid-polymer electrolyte membrane 32 can be held so firmly in the cell-base 40 that it will not sag. Note that the terminal electrodes 41.42 serve as the cathode electrode and anode electrode respectively.

FIG. 8 is a schematic view of a main part of a fuel cell comprising a plurality of the cell structures 31. The cell structures 31 are aligned horizontally in a honey-comb matrix with all the anodes 33 facing upward and all the cathodes facing downward, and the honey-comb matrix, or the set, is fixed by an unillustrated insulating frame. The top surface of the set is entirely covered with an unillustrated anode-gas manifold, while the entire bottom surface of the set is entirely covered with an unillustrated cathode-gas manifold. A hydrogen gas and air are supplied to the anode-gas manifold and cathode-gas manifold respectively.

Like in the first embodiment, the cell structures 31 are aligned in such a way that the cathode terminal 41 of each cell structure 31 and the anode terminal of the adjacent cell structure 31 will contact in series to connect all the cell structures 31 in the set in series as well. The contacting surfaces between the adjacent cell structures 31 are sealed off by sealing members to prevent the anode gas and cathode gas leakage.

As has been stated, the fuel cell assembled as above can be of any structure and have any electrical connection as desired. Moreover, the resulting fuel cell is compact due to the simple wiring while being capable of outputting a high voltage.

THIRD EMBODIMENT

Figure 9:
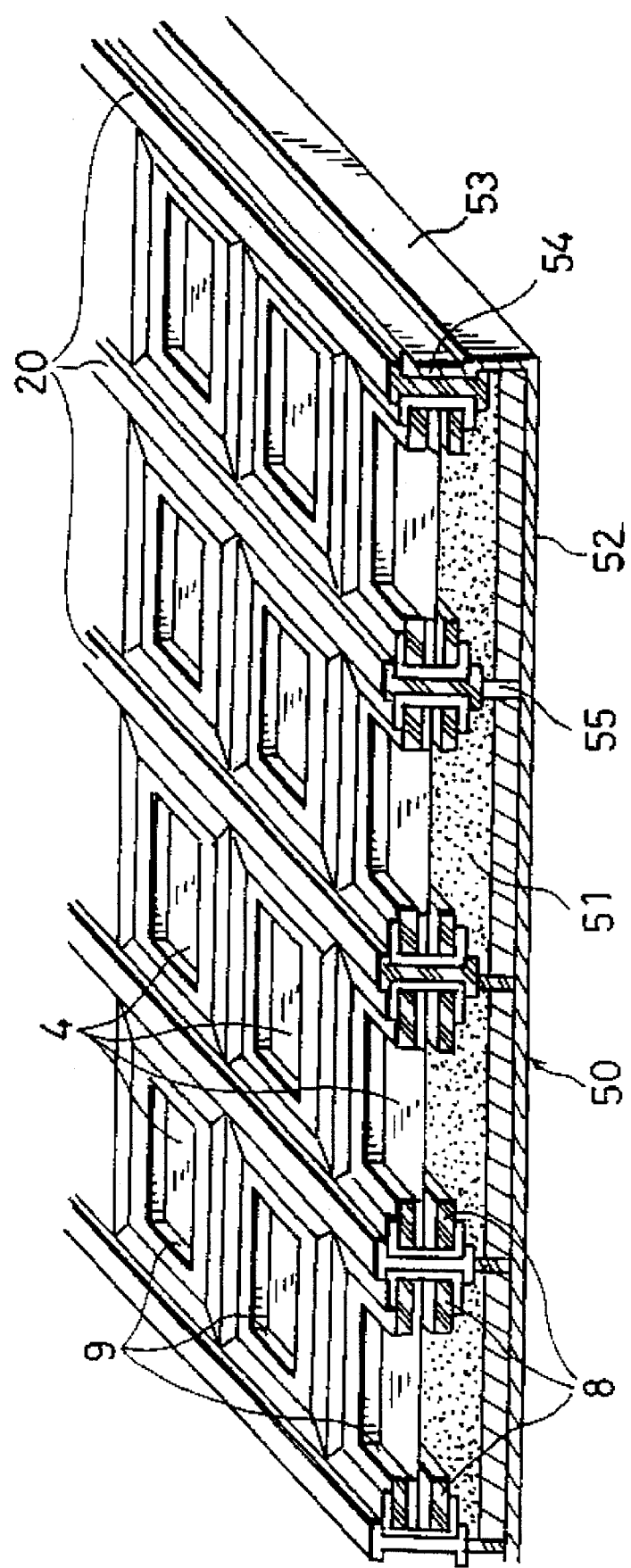
FIG. 9 is a partly perspective and partly cross sectional view of a fuel cell in accordance with a third embodiment of the present invention.

FIG. 9 is a partly perspective view (a partly cross sectional view) of a fuel cell in accordance with a third embodiment of the present invention. A number of the quadratic-prism cell structures 1 of the first embodiment are aligned in a matrix. An anode-gas manifold 50 including a predetermined amount of hydrogen absorbing alloy 51 is placed to cover the surface on which the anodes lie, while the other surface is open to the air. Note that the anode 3 and cathode 4 are placed in a reversed manner to the first embodiment. This is done so to hold the hydrogen absorbing alloy 51 by forming the anode-gas manifold 50 underneath.

The anode-gas manifold 50 comprises a square base plate 52 and a plurality of side plates 53; the square base plate 52 is of about the same size of the set, and the side plates 53 are formed vertically on all the four side surfaces (the circumference) of the square base plate 52. Convex units 54 are formed at all the top edges of the side plates 53 to be engaged with the H-shaped rails 20; the manifold 50 is attached to the set by engaging the convex units 54 with the H-shaped rails 20 at the edges. The hydrogen absorbing alloy 51 is a rare earth metal based—nickel based powder alloy having an evolving pressure larger than an ambient pressure at room temperature; for example, a powder alloy made of MnNi, Mn, Al, Fe, and Co in the ratio of 4.32:0.18:0.1:0.1:0.3. Further, to improve a strength of the manifold 50 and support the set, cross pieces 55 are formed optionally at locations corresponding to the H-shaped rails 20.

The fuel cell assembled as above generates electricity using hydrogen supplied to the anode 3 from the hydrogen absorbing alloy 51 and oxygen supplied to the cathode 4 from air. When the hydrogen is consumed, the hydrogen absorbing alloy 51 can be replaced with a new one by removing the anode-gas manifold 50, and the used one can be replenished with hydrogen to be used again. The above construction obviates separate anode-gas and cathode-gas sources such as a hydrogen cylinder or a pump, thereby enabling a compact, high-voltage generating fuel cell.

OTHERS REMARKS

1) A plurality of the sets explained in the first and second embodiments may be layered to form three-dimensional matrices. In this case, the sets are layered in such a manner that the cathode surface and anode surface will oppose each other with the anode-gas manifold or cathode-gas manifold being interposed therebetween. All the cells in the layered sets can be connected in series by connecting the cells in each set in series to yield a higher voltage.

Figure 10:
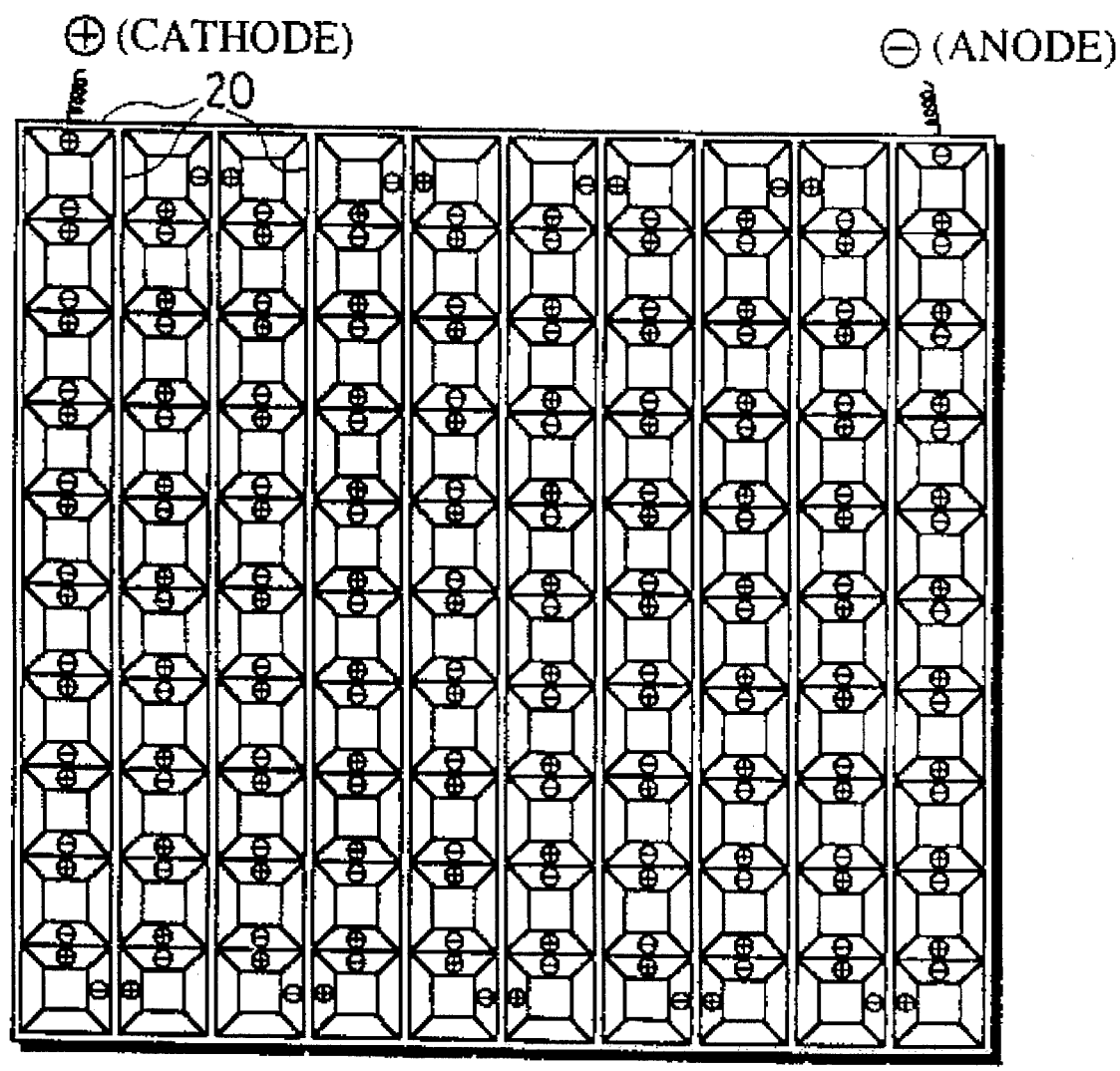
FIG. 10 is a schematic view of the fuel cell of the first embodiment partly replaced with modified cell structures.

2) In the first and second embodiments, a pair of the terminal electrodes, or namely the cathode terminal and anode terminal, are formed on the two opposing side surfaces of the quadratic and hexagonal prisms respectively. However, the two terminal electrodes may be formed on two adjacent side surfaces or diagonally opposing side surfaces in case of the hexagonal prism. Note that an insulating material must be interposed between the two terminal electrodes when they are adjacent. FIGS. 10 and 11 show schematic views of fuel cells comprising partly such modified cell structures; both the cell structures and modified cell structures are connected in series. Thus, the cell structures in the set can be connected in any desired manner without using any specific wiring by replacing the cell structures at the edges with the modified cell structures.

3) In the foregoing embodiments, the present invention is utilized in the PEFC structure. However, the present invention can be applied to the other types of fuel cells, such as SOFC or MCFC.

4) The cathode and anode are connected to their respective terminal electrodes by means of the collector plates in the foregoing embodiment. However, the cathode and anode may be connected directly to their respective terminal electrodes.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A cell structure for use in a fuel cell, said cell structure comprising:

an anode;

a cathode;

an electrolyte plate interposed between the anode and the cathode;

a pair of insulating keep-plates sandwiching the anode, the cathode and the electrolyte plate in a direction in which the anode, the cathode and the electrolyte plate are layered, each of the insulating keep-plates being provided with an opening for supplying an anode gas or a cathode gas to the anode or the cathode, respectively, from a face surface of the cell structure;

at least one anode terminal electrode electrically connected to said anode, said anode terminal electrode being disposed along an edge of the cell structure; and at least one cathode terminal electrode electrically connected to said cathode, the cathode terminal electrode being disposed along another edge of the cell structure.

2. The cell structure of claim 1, wherein the electrolyte plate is a solid-polymer electrolyte membrane.

3. The cell structure of claim 1, further comprising:
at least one holding member for applying a pressure from outer surfaces of said pair of insulating keep-plates to said pair of insulating keep-plates, said electrolyte plate, said anode, and said cathode to be pressed to each other.

4. The cell structure of claim 3, wherein each of the two terminal electrodes has a U-shaped cross section extending from a side surface to two face surfaces of said cell structure, whereby said two terminal electrodes apply a pressure from outer surfaces of said pair of insulating keep-plates at least to said insulating keep-plates, said electrolyte plate, said anode, and said cathode to be pressed to each other.

5. The cell structure of claim 1, wherein each of the two terminal electrodes has a U-shaped cross section extending from a side surface to two face surfaces of said cell structure, whereby said two terminal electrodes apply a pressure from outer surfaces of said pair of insulating keep-plates at least to said insulating keep-plates, said electrolyte plate, said anode, and said cathode to be pressed to each other.

6. The cell structure of claim 1, wherein said anode terminal electrode and said cathode terminal electrode are in direct contact with said anode and said cathode respectively.

7. The cell structure of claim 1, further comprising:
at least one first collector plate for connecting said anode terminal electrode and said anode, a window being formed on said first collector plate to supply an anode gas from one face surface of said cell structure to said anode; and
at least one second collector plate for connecting said cathode terminal electrode and said cathode, a window being formed on said second collector plate to supply a cathode gas from another face surface of said cell structure to said cathode.

8. A fuel cell which comprises a set of the cell structures of claim 1, said cell structures being aligned horizontally with all the anodes facing in a first direction and all the cathodes facing in a second direction to be connected by means of a physical contact between desired terminal electrodes of adjacent cell structures, and
wherein a gas manifold is attached to at least one face surface of said cell structures to cover the anodes.

9. The fuel cell of claim 8, wherein a hydrogen absorbing alloy is held inside the gas manifold.

10. The fuel cell of claim 8, wherein the cathodes are open to air.

11. The fuel cell of claim 8, wherein said fuel cell comprises two of said sets, said two sets being installed so that the anodes of said two sets oppose each other with said gas manifold being installed therebetween.

12. A cell structure for use in a fuel cell, said cell structure comprising:
an electrolyte plate, an anode, and a cathode, said anode being formed on one surface of said electrolyte plate, said cathode being formed on the other surface of said electrolyte plate;
an anode terminal electrode connected to said anode electrically, said anode terminal electrode being placed along an edge of said cell structure to be perpendicular with respect to a direction in which said cathode, said electrolyte plate, and said anode are layered;
a cathode terminal electrode connected to said cathode electrically, said cathode terminal electrode being placed along another edge of said cell structure to be perpendicular with respect to said layered direction;
a first gas channel for supplying reactant gas to said anode in said layered direction; and
a second gas channel for supplying reactant gas to said cathode in said layered direction.

13. The cell structure of claim 12, further comprising:
a pair of insulating keep-plates for sandwiching at least said anode, said electrolyte plate, and said cathode in said layered direction, said first and second gas channels being formed on said pair of insulating keep-plates respectively.

14. The cell structure of claim 13, wherein said first and second gas channels are windows formed in said layered direction on said pair of insulating keep-plates.

15. The cell structure of claim 14, further comprising:
a first collector plate for connecting said anode and said anode terminal electrode electrically, said first collector plate being sandwiched by one of said pair of insulating keep-plates and said anode; and
a second collector plate for connecting said cathode and said cathode terminal electrode electrically, said second collector plate being sandwiched by the other insulating keep-plate and said cathode,
wherein a window is formed on each collector plate in said layered direction at a location opposed to said windows formed on said insulating keep-plates.

16. The cell structure of claim 15, wherein a circumference of said window formed on said first collector plate is smaller than a circumference of said anode, and a circumference of said window formed on said second collector plate is smaller than a circumference of said cathode.

17. The cell structure of claim 16, further comprising:
at least one holding member for applying a pressure from outer surfaces of said pair of insulating keep-plates to said pair of insulating keep-plates, said electrolyte plate, said anode, and said cathode to be pressed to each other.

18. The cell structure of claim 17, wherein each of the two terminal electrodes has a U-shaped cross section extending from a side surface to two face surfaces of said cell structure, whereby said two terminal electrodes apply a pressure from outer surfaces of said pair of insulating keep-plates at least to said insulating keep-plates, said electrolyte plate, said anode, and said cathode to be pressed to each other.

19. The cell structure of claim 18, wherein a space between said first collector plates and one of said insulating keep-plate opposed thereto is sealed off by a first sealing member, said first sealing member encircling said windows formed on said first collector plate and said one insulating keep-plate;
a space between said second collector plates and the other insulating keep-plate opposed thereto is sealed off by a second sealing member, said second sealing member encircling said windows formed on said second collector plate and the other insulating keep-plate,
whereby said cathode, said electrolyte plate, said anode, said first and second collector plates, said first and second sealing members are press-adhered by said holding member and said two terminal electrodes.

20. The cell structure of claim 19, wherein said cell structure is a quadratic prism comprising two terminal electrodes of a same configuration and a same size, and two holding members of a same configuration and a same size, said two terminal electrodes being placed along two edges of said cell respectively, said two holding members being placed along the other two edges of said cell respectively.

21. The cell structure of claim 19, wherein said cell structure is a hexagonal prism comprising two terminal electrodes of a same configuration and a same size, and four holding members of a same configuration and a same size, said two terminal electrodes being placed along two edges of said cell respectively, said four holding members being placed along the other four edges of said cell respectively.

22. A fuel cell which comprises a set of said cell structures of claim 17, said cell structures being aligned horizontally with all the anodes facing in a first direction and all the cathodes facing in a second direction to be connected by means of a physical contact between desired terminal electrodes of adjacent cell structures, and wherein a gas manifold is attached to at least one face surface of said cell structures to cover the anodes.

23. The fuel cell of claim 22, wherein a hydrogen absorbing alloy is held inside said gas manifold.

24. The fuel cell of claim 22, wherein the cathodes are open to air.

25. The fuel cell of claim 22, wherein said fuel cell comprises two of said sets, said two sets being installed so that the anodes of said two sets oppose each other with said gas manifold being installed therebetween.

26. The cell structure of claim 12, wherein the electrolyte plate is a solid-polymer electrolyte membrane.

* * * * *